US007926643B2

(12) United States Patent
De Jong

(10) Patent No.: US 7,926,643 B2
(45) Date of Patent: Apr. 19, 2011

(54) DEVICE FOR FORMING A NUMBER OF ROWS OF OBJECTS IN PARTICULAR FOR PRODUCING SANDWICH BISCUITS

(75) Inventor: Henricus Nikolaas Johannes De Jong, Delft (NL)

(73) Assignee: BV Machinefabriek Houdijk, Vlaardingen (NL)

( * ) Notice: Subject to any disclaimer, the term of this patent is extended or adjusted under 35 U.S.C. 154(b) by 46 days.

(21) Appl. No.: 12/549,764

(22) Filed: Aug. 28, 2009

(65) Prior Publication Data

US 2010/0051416 A1    Mar. 4, 2010

(30) Foreign Application Priority Data

Aug. 28, 2008    (NL) .................................... 1035879

(51) Int. Cl.
*B65G 47/24*    (2006.01)
*B65G 47/26*    (2006.01)

(52) U.S. Cl. ....... 198/374; 99/450.4; 198/402; 198/406; 198/418.1; 198/418.5; 198/419.1; 198/431; 198/458; 198/459.7; 198/530; 198/547; 198/617; 193/46

(58) Field of Classification Search .................. 198/374, 198/402–403, 406, 419.1, 418.1–418.3, 418.5, 198/418.7–418.85, 457.07, 458, 459.6, 459.7, 198/530, 547, 617; 99/450.4; 193/46
See application file for complete search history.

(56) References Cited

U.S. PATENT DOCUMENTS

| 1,764,663 | A | * | 6/1930 | Voigt | 198/359 |
|---|---|---|---|---|---|
| 3,149,584 | A | * | 9/1964 | Oakes et al. | 425/96 |
| 3,348,503 | A | * | 10/1967 | Beik et al. | 99/450.4 |
| 3,762,305 | A | * | 10/1973 | Glackin | 99/450.4 |
| 4,114,524 | A | * | 9/1978 | Welch | 99/450.4 |
| 4,892,181 | A |   | 1/1990 | Hogenkamp | 198/434 |
| 5,381,883 | A | * | 1/1995 | Mims | 198/374 |
| 5,630,496 | A | * | 5/1997 | Mims | 198/374 |
| 5,899,315 | A |   | 5/1999 | Mercer et al. | 198/374 |
| 6,098,782 | A | * | 8/2000 | Hardage et al. | 198/403 |
| 2005/0061162 | A1 |  | 3/2005 | Miller et al. | 99/443 |

FOREIGN PATENT DOCUMENTS

| DE | 196 08 070 | 9/1997 |
|---|---|---|
| EP | 0 284 835 | 10/1988 |
| EP | 1 344 457 | 9/2003 |
| FR | 2 759 864 | 8/1998 |
| GB | 1 264 029 | 2/1972 |

* cited by examiner

*Primary Examiner* — Mark A Deuble
(74) *Attorney, Agent, or Firm* — Roberts & Roberts, LLP

(57) ABSTRACT

A method for forming a number of side by side lying rows of objects such as for producing sandwich biscuits. Firstly the products being supplied to the even channels are turned over and, as well as the not turned over products are brought on a conveyor belt. In a second step by means of a continuous rotatable first roller positioned above the conveyor belt and being provided with pins a product can be released from each channel and the next product can be stopped for the formation of rows of turned over and not turned over products running in a direction transverse to the direction of movement of the conveyor belt. Thereupon by means of rollers at least one of which is movable in axial direction, the turned over and not turned over products are moved in longitudinal and transverse direction to obtain alternate transverse rows of turned over and not turned over products.

17 Claims, 3 Drawing Sheets

FIG. 2
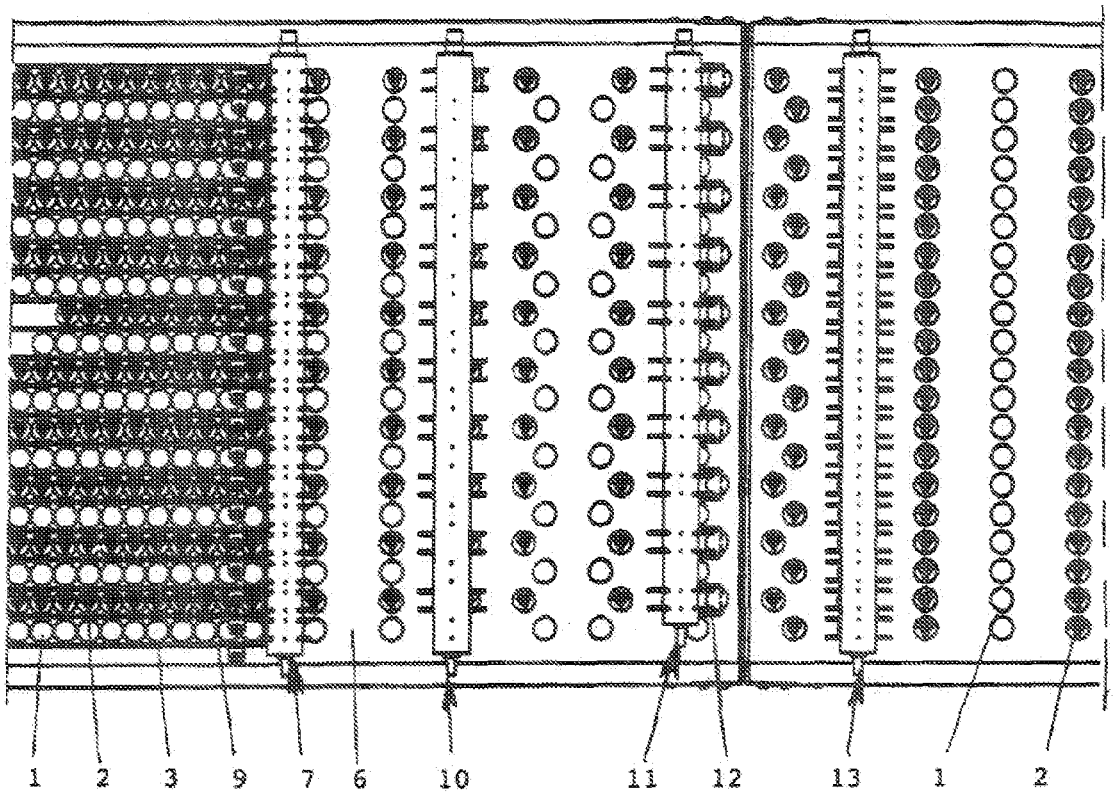
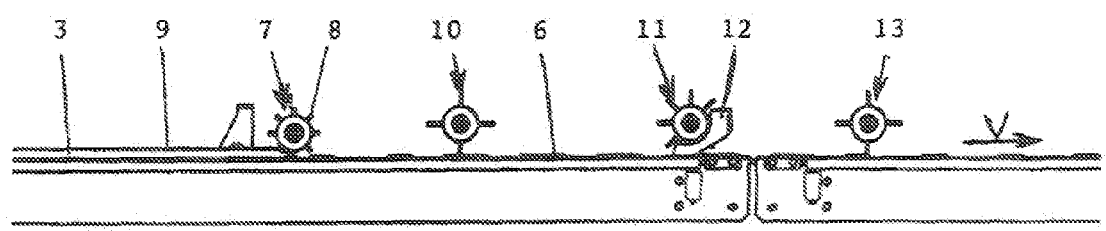
FIG. 3

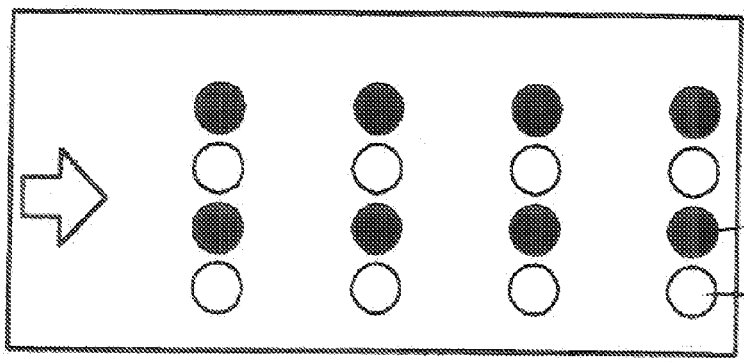
FIG. 4.1
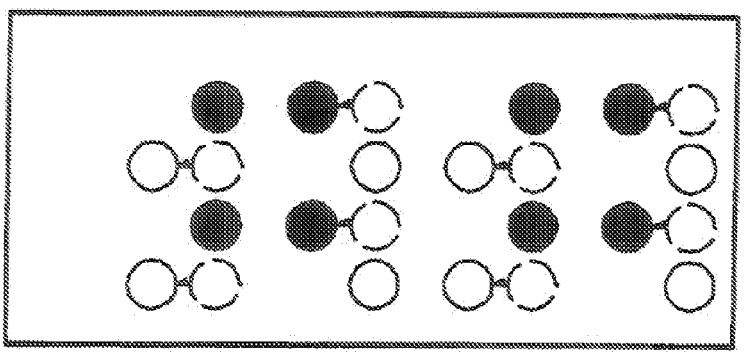
FIG. 4.2
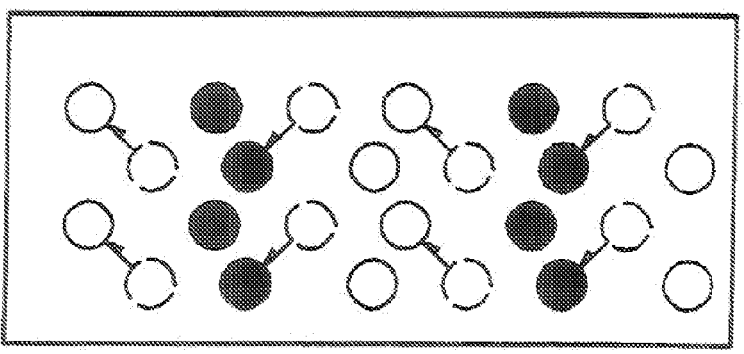
FIG. 4.3
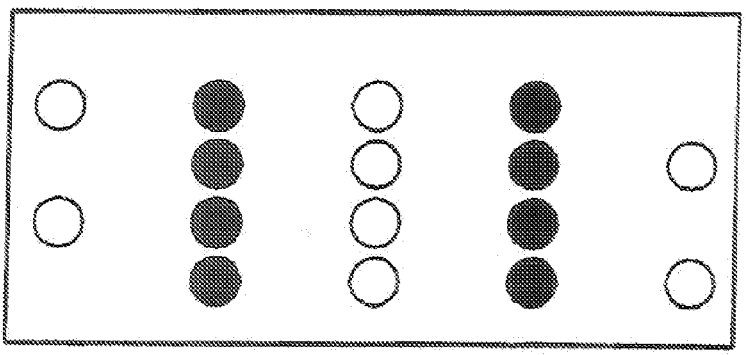
FIG. 4.4

DEVICE FOR FORMING A NUMBER OF ROWS OF OBJECTS IN PARTICULAR FOR PRODUCING SANDWICH BISCUITS

The invention relates to a device for forming a number of side by side lying rows of objects, such as biscuits for producing sandwich biscuits, in which corresponding surfaces of the objects are lying opposite each other.

By a sandwich biscuit it is understood an object consisting of two products, in particular biscuits, lying upon each other with a thin layer of cream between them.

The products are produced in a fully continuous process of: dough preparing, cutting out, baking and cooling. In most cases the products are produced in a number of channels divided across the width of the oven, mostly in sixteen up to twenty four paths, depending on the size of the product and the width of the oven belt.

The surfaces of a product, leaving the oven, are having a different exterior. The upper side is called the "print-side". So for forming a sandwich biscuit, both sides of which are having the same exterior, one of said products has to be turned over, before it is positioned upon the other one.

Systems are known in which the products are manipulated per channel, such that each time one product is turned over and the next one is not handled. Caused by the nature of the product in many cases this will not happen in the right way, such that manual action will be necessary to maintain the desired supplying pattern.

A disadvantage of the systems mentioned before is that they have a limited velocity and are mechanically cumbrous, by which troubles—e. g. caused by broken products—are difficult to repair.

Now the object of the invention is to provide a device that does not have said disadvantages and allows a high production velocity.

According to the invention it is provided for that in a first step the products, being supplied to the even channels, are turned over and, as well as the not turned over products, are brought in the engaging position on a conveyor belt, that in a second step by means of a continuous rotatable first roller, positioned above the conveyor belt and being provided near each channel with pins divided over its periphery, a product can be released from each channel and the next product can be stopped such that after each of said channels, seen in a direction transverse to the direction of movement of the conveyor belt, distanced rows of alternate turned over and not turned over products are obtained, by which in next steps by means of a number of continuous rotatable rollers, positioned above the conveyor belt and being provided with pins, at least one of said rollers being movable in axial direction, the turned over and not turned over products can be moved in longitudinal and transverse direction in respect of the conveyor belt to obtain alternate rows of turned over and not turned over products.

In particular the pins, provided in said first roller, are executed such that they are pressed resiliently outwards.

Further the rows of products can be handled in the known way, such as bringing a thin layer of cream on one of the products and positioning a product on this which follows said first product as seen in the longitudinal direction of the conveyor belt. Obviously the products can be handled further in some other way.

Although in said first step it mostly is sufficient that single pins are provided in said first roller for each row of products, it might be desired that more than one pin for each product is present on said rollers, in particular in view of the following steps.

Further, instead of pins either alternating with the pins U-shaped bows can be provided on the rollers.

In particular by this the displacement of the products, transverse to the direction of movement of the conveyor belt, can be better ascertained, so that the possibility of disturbances is decreased.

Further the mounting of the pins on the roller in particular will depend on the shape and the texture of the products to be handled. The products might have a round, as well as a square, rectangular either some other shape. So the device can be used for producing other products too.

Further the invention will be elucidated by means of an embodiment of a device according to the invention, shown in the accompanying drawing, in which:

FIG. 2 shows a plan view of a part of the device of FIG. 1;

FIG. 3 shows a side view of the device of FIG. 2;

Figure 1:
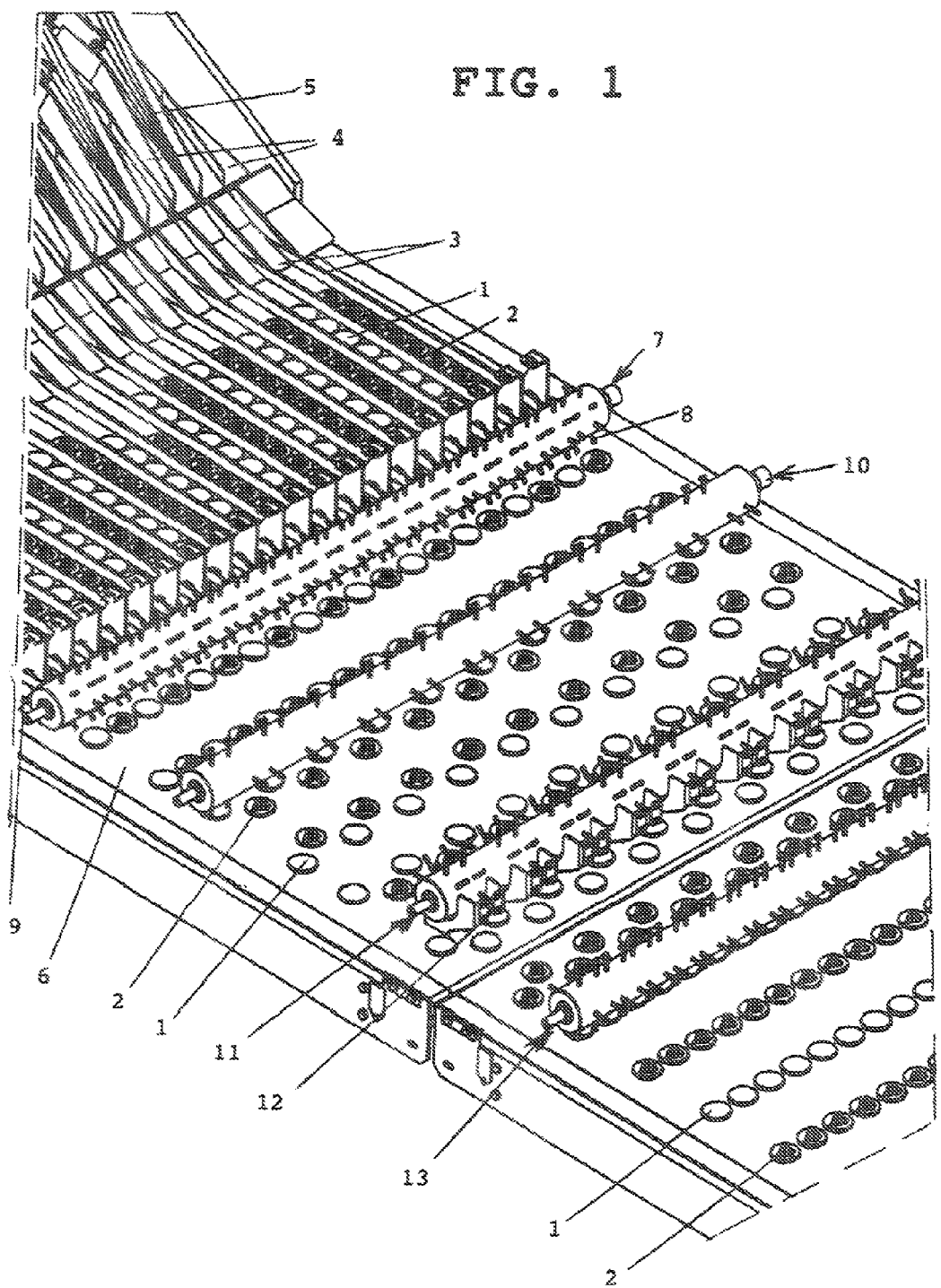
FIG. 1 shows a perspective view, obliquely from above, of a part of a device according to the invention.

FIG. 4.1 up to 4.4 incl. show the positions of the turned over and the not turned over products when these follow the various steps of the displacement.

As in particular appears from the FIGS. 1 and 2, out of a not shown oven, the products 1 and 2 are supplied to a number of channels 3, the first part 4 of which slants downwards.

In this downwardly slanting part 4 of the channels the even channel parts, in FIG. 1 beginning with the second upper one, are provided with a turn over guide 5. By this guide 5 a product 1 will be turned such that its surface first lying above will become the lower surface of the product.

In the following the turned over products are indicated by 1 and the not turned over products by 2. The products 1 are indicated by an open circle, whereas in case of the products 2 in the circle a triangle is shown, either said circle is made totally black.

As appears from the FIGS. 1 and 2 all products 1 and 2 will arrive on a conveyor belt 6 in an engaging position and near the first roller 7, being provided with the pins 8. During operation the roller 7 is continuously rotated and the pins 8 are pressed outwardly over a certain distance by means of springs, not shown. So they can contact the conveyor belt 6 somewhat earlier than in the position in which they are running perpendicular to the conveyor belt.

By means of the roller 7 again and again a transverse row of products 1 and 2 can be released, as in particular appears from FIG. 1. The side walls 9 of the channels 3 are missing from the roller 7 and the products are, generally speaking, only in contact with the conveyor belt 6.

After having passed the roller 7 the products 1 and 2 will be distanced from each other, as indicated in FIG. 2 and in particular also in FIG. 4.

After this the products will arrive near the following roller 10, shown in FIG. 2. The roller 10 takes care for it that the products take up the position shown in FIG. 2 and in particular in FIG. 4.2.

Near the next roller 11, provided with plates either U-shaped bows 12, the products are also transversely displaced, such that they arrive in the positions indicated in FIG. 2 and in particular in FIG. 4.3.

Finally the products arrive near the roller 13, which takes care for it that, transverse to the direction of movement V of the conveyor belt 6, succeeding rows of products 1 and 2 are formed, as shown in FIG. 2 and in particular in FIG. 4.4.

As in particular appears from FIG. 3 the rollers 10, 11 and 13 will be provided with different types and different number of pins to obtain the desired object.

It will be obvious that only one possible embodiment of a device according to the invention is shown in the drawing and is described above and that many modifications can be made without leaving the inventive idea, as this is indicated in the appended claims.

The invention claimed is:

1. A method for forming a number of side by side lying rows of objects in which corresponding surfaces of the objects are lying opposite each other, comprising a first step wherein objects are supplied to even channels, are turned over and, the turned over objects as well as the not turned over objects are brought in an engaging position on a conveyor belt, that in a second step by means of a continuous rotatable first roller positioned above the conveyor belt and being provided near each channel with pins divided over its periphery, an object can be released from each channel and the next object can be stopped such that after each of said channels, seen in a direction transverse to the direction of movement (V) of the conveyor belt, distanced rows of alternate turned over and not turned over objects are obtained, by which in next steps by means of a number of continuous rotatable rollers positioned above the conveyor belt and being provided with pins, at least one of said rollers being movable in axial direction, the turned over and not turned over objects are moved in longitudinal and transverse direction in respect of the conveyor belt to obtain alternate rows of turned over and not turned over objects.

2. The method according to claim 1, wherein the pins provided in said first roller are positioned such that they are pressed resiliently outwards.

3. The method according to claim 1 wherein more than one pin for each product is present on said rollers.

4. The method according to claim 1 wherein wherein the pins alternate with U-shaped bows provided on the rollers.

5. The method according to claim 2 wherein more than one pin for each product is present on said rollers.

6. The method according to claim 2 wherein the pins alternate with U-shaped bows provided on the rollers.

7. The method according to claim 3 wherein the pins alternate with U-shaped bows provided on the rollers.

8. The method according to claim 5 wherein the pins alternate with U-shaped bows provided on the rollers.

9. The method of claim 1 wherein the objects comprise biscuits.

10. The method of claim 2 wherein the objects comprise biscuits.

11. The method of claim 3 wherein the objects comprise biscuits.

12. The method of claim 4 wherein the objects comprise biscuits.

13. The method of claim 5 wherein the objects comprise biscuits.

14. The method of claim 6 wherein the objects comprise biscuits.

15. The method of claim 7 wherein the objects comprise biscuits.

16. The method of claim 8 wherein the objects comprise biscuits.

17. A method for forming a number of side by side lying rows of objects in which corresponding surfaces of the objects are lying opposite each other, comprising a first step wherein objects are supplied to even channels are turned over and, the turned over objects as well as the not turned over objects are brought in an engaging position on a conveyor belt that in a second step by means of a continuous rotatable first roller positioned above the conveyor belt and being provided near each channel with U-shaped bows divided over its periphery, an object can be released from each channel and the next object can be stopped such that after each of said channels, seen in a direction transverse to the direction of movement (V) of the conveyor belt, distanced rows of alternate turned over and not turned over objects are obtained, by which in next steps by means of a number of continuous rotatable rollers positioned above the conveyor belt and being provided with U-shaped bows, at least one of said rollers being movable in axial direction, the turned over and not turned over objects are moved in longitudinal and transverse direction in respect of the conveyor belt to obtain alternate rows of turned over and not turned over objects.

* * * * *